(No Model.)
T. MEYER.
COMBINED HAY AND FODDER RACK.
No. 567,838.  Patented Sept. 15, 1896.
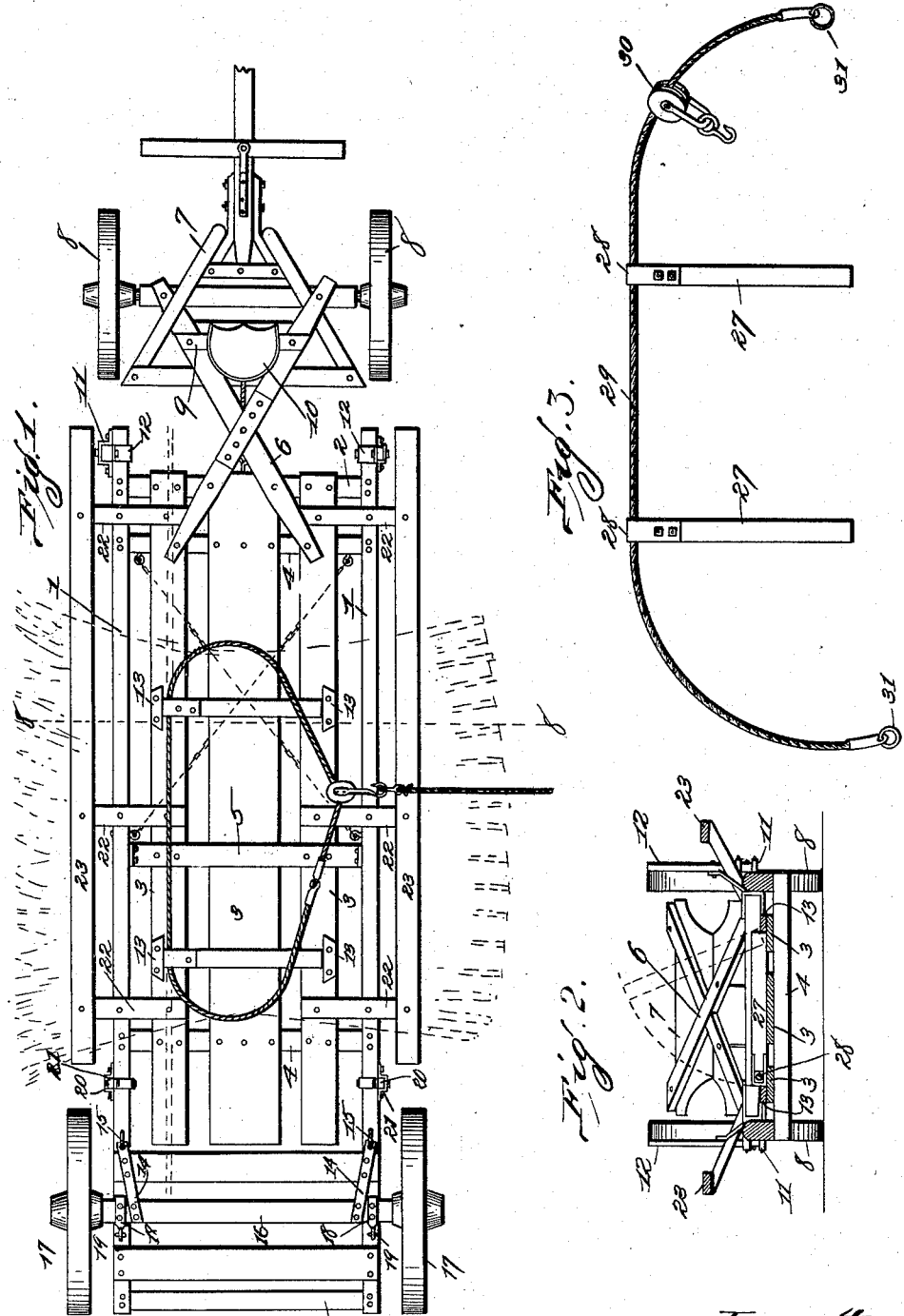
Attest  
J. M. Smith  
S. G. Wells
Inventor:—  
Theodore Meyer:—  
By Higdon & Higdon & Longan  
Attys.

UNITED STATES PATENT OFFICE.

THEODORE MEYER, OF SCHLUERSBURG, MISSOURI.

COMBINED HAY AND FODDER RACK.

SPECIFICATION forming part of Letters Patent No. 567,838, dated September 15, 1896.

Application filed November 21, 1895. Serial No. 569,622. (No model.)

*To all whom it may concern:*

Be it known that I, THEODORE MEYER, of the city of Schluersburg, St. Charles county, State of Missouri, have invented certain new and useful Improvements in a Combined Hay and Fodder Rack, of which the following is a full, clear, and exact description, reference being had to the accompanying drawings, forming a part hereof.

My invention relates to an improved combined hay and fodder rack; and it consists in the novel construction, combination, and arrangement of parts hereinafter described and claimed.

In the drawings, Figure 1 is a top plan view of my improved combined hay and fodder rack, showing the means I employ for unloading the same. Fig. 2 is a cross-sectional view, the operation of the means for unloading the rack being shown in dotted lines. Fig. 3 is an enlarged detail view of one form of the unloading device.

In the construction of the device, as shown, the longitudinally-extending timbers 1 are framed together by cross-timbers 2. Extending longitudinally between the timbers 1 are timbers 3, the front end of the same resting upon the front one of the transverse timbers 2. Extending transversely beneath these timbers 3 and at a point intermediate their ends are strengthening-timbers 4. The timber 5 is positioned transversely of the timbers 3 and on top of said timbers and the extreme ends of said timber 5 are attached to the timbers 1.

6 6 indicate timbers the rear ends of which are bolted to the timbers 3 and to the forward one of the transverse timbers 2, said timbers 6 extending upwardly and crossing one another and their forward ends being bolted to the bolster of a truck 7, mounted upon ordinary traction-wheels 8. Said truck is provided with an ordinary tongue and doubletree, and extending transversely between the forward ends of the cross-timbers 6 is a timber 9, to which is bolted a driver's seat 10.

Loops 11 are bolted to the sides of the forward ends of the timbers 1, and in said loops are located the lower ends of upwardly and forwardly extending timbers 12, that are intended to act as fenders for the front wheels. Pairs of plates 13 are bolted to the tops of the outside pair of timbers 3, the purpose of said plates being presently shown.

14 indicates pairs of metallic bars that are secured at their forward ends to loops 15, fixed to the tops of the timbers 1, and from thence said bars extend upwardly and are bolted on each side to an axle 16, the same being mounted on ordinary traction-wheels 17. Bolted to the top of this axle are hooks 18, that engage the upper ends of chains 19, the same extending downwardly on the rear side of the axle and being secured in any suitable manner to the rear ends of the timbers 1. Fender-bars 20 have their lower ends seated in loops 21, bolted to the sides of the timbers 1, said fenders extending upwardly and rearwardly over the rear wheels 17. Bolted to the top of the side timbers 3 and to the tops of the timbers 1 are timbers 22, the same extending upwardly and outwardly and carrying at their outer ends longitudinally-extending rails 23.

27 indicates bars of such length as that when they lie transversely upon the timbers 3 their ends will abut against the metallic plates 13. At one end of each of these bars 27 is fixed a loop, such as 28, through which passes a cable 29, said cable 29 carrying a pulley 30 and hooks 31 at its ends.

When it is intended to transport hay or small bundles of grain with my improved rack, the same is constructed as seen in Figs. 1, 2, and 3. Owing to the entire rack being in close proximity to the ground the hay or small bundles of grain may be loaded upon said rack very easily and in less time than where the ordinary hay rack or frame is used. Should it be desired to elevate the rack or frame a slight distance, it can be accomplished by tightening up the bolts that secure the ends of the cross-timbers 6 to said frame and by raising the rear end of the frame, which is accomplished by shortening the chains 19. When the rack is used for transporting large shocks of corn, fodder, &c., the timbers 22 and 23 are dispensed with. The frame thus transformed is brought into a position to one side of the shocks of grain, and a rope or cable is passed around said shocks, after which the free end of said rope or cable is passed over the frame or rack. The hook of the doubletree is attached to the free end of the rope and a team of draft-animals hitched to said doubletree. In this manner the shock can be drawn over upon the rack, by which it is transported to whatever point desired.

For expeditiously unloading hay and the like I make use of the means shown in Fig. 3. The bars 27 are located transversely, previous to the loading of hay on the frame, upon the timbers 3, the ends of said bars abutting against the plates 13, and the ends of the cable 29 are brought over the side of the frame. To unload the frame by this means, the ends of the cable are brought together over the load and the hooks 31 engaged with one another, and the doubletree, carried by a team of draft-animals, is attached to the hook of the block 30. When said draft-animals are started, the cable 29, pulling on the ends of the bars 27, will elevate the same and thus discharge the load of hay or fodder from the rack.

A combined hay and fodder rack of my improved construction possesses superior advantages in point of simplicity, durability, and general efficiency, and is easily and cheaply constructed.

I claim—

In a fodder-rack, a pair of horizontally-positioned longitudinally-extending timbers, plates forming stops upon the upper edges of said timbers, a pair of bars lying transversely upon said timbers with one end of each bar abutting the stops formed by said plates, loops upon the opposite ends of said bars, a cable passing through said loops, and a block and pulley upon said cable, substantially as herein specified.

In testimony whereof I affix my signature in presence of two witnesses.

THEODORE MEYER.

Witnesses:
 JOHN C. HIGDON,
 MAUD GRIFFIN.